Nov. 17, 1925.
A. T. RAUTENBERG
1,562,124
SKATE WHEEL
Filed Feb. 17, 1925
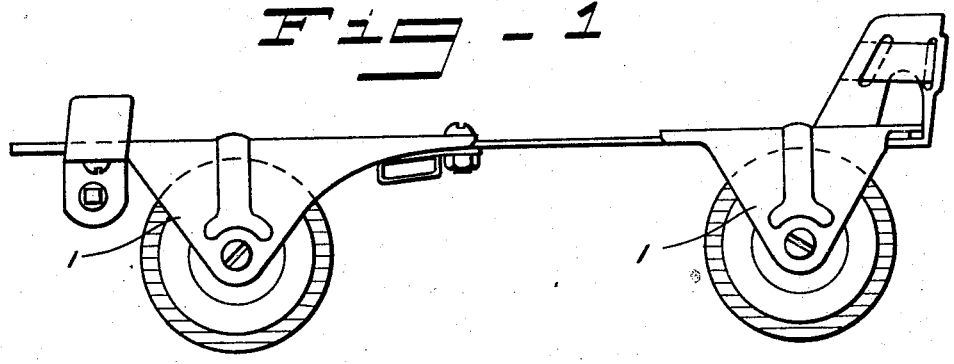
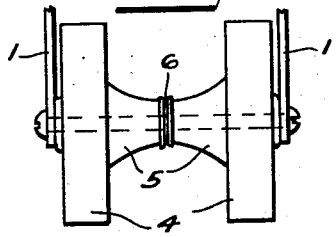
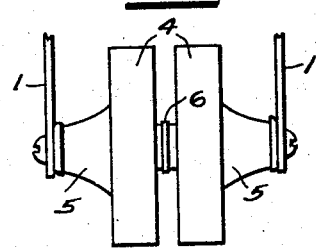
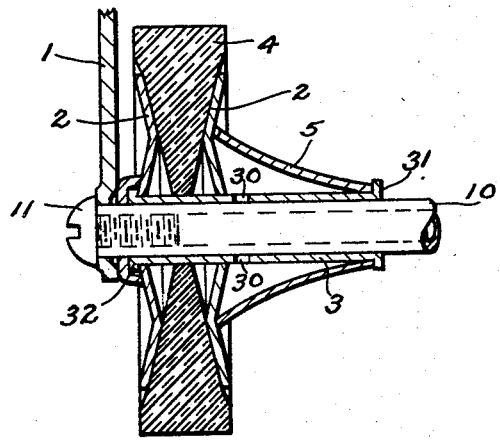
INVENTOR
*Alfred T. Rautenberg*
BY
ATTORNEYS Patented Nov. 17, 1925.

1,562,124

UNITED STATES PATENT OFFICE.

ALFRED T. RAUTENBERG, OF SEATTLE, WASHINGTON.

SKATE WHEEL.

Application filed February 17, 1925. Serial No. 9,763.

*To all whom it may concern:*

Be it known that I, ALFRED T. RAUTENBERG, a citizen of the United States of America, and resident of the city of Seattle, in the county of King and State of Washington, have invented certain new and useful Improvements in Skate Wheels, of which the following is a specification.

My invention relates to roller skates and consists of the novel and improved construction for the wheels and the bearings of such skates.

One object of my invention is to produce a wheel for roller skates, of such character as will largely eliminate the noises made by usual roller skates.

Another object is to provide wheels having their tread surfaces of a material having both a measure of resiliency and also sufficient degree of softness as will prevent marring or injuring the skating floor.

A further object of my invention is to construct a wheel adapted for use on roller skates in which the frame-work thereof may be composed of metal stamping, thereby contributing to the cheapness of manufacture, lightness of weight, strength, and durability of the wheel.

Other objects of my invention may be seen from a study of the drawings and specifications of this case.

In the accompanying drawings I have shown my invention embodied in the type of structure which is now preferred by me.

Figure 1 is a side view of a skate having wheels of my type of construction thereon.

Figures 2 and 3 represent front views of two different methods of mounting the wheels upon the skate frame.

Figure 4 is a section taken through one of the wheels in a plane parallel with the axis of the wheel.

While I have referred to my wheel as being designed for use upon roller skates, I do not, however, intend to limit the invention to use upon roller skates, but to claim the same for any use to which it may be put. It will be evident that there are many other uses for which my invention is adapted.

As my invention has to do with the construction of the wheels and the bearings therefor, description of the construction of the wheel frame is deemed unnecessary. It will suffice to say that the frame illustrated has standards 1 extending downwardly and provided with means for engaging and supporting the axis upon which the wheels turn.

In constructing the wheels I use two side plates 2, which are stamped from sheet metal. These plates are made as two bands or segments of two oppositely tapering cones which intersect at a point intermediate between the axis of the wheel and the periphery thereof. Each of these side plates is, therefore, dished or hollowed, and their surfaces consist of two oppositely inclined frustums of cones.

Between these side plates is placed a tread body 4, which I prefer to make of a rubber compound, that is, a material of which rubber forms one of the more essential ingredients. The object of this is to provide a wheel tread or rolling surface which will have a heavy frictional grip upon the skating floor and which will also have a certain amount of compressibility and resiliency.

Through central holes formed in the side plates 2, extends a thimble or sleeve 3. The side plates fit snugly upon this sleeve. This sleeve constitutes one of the bearing members. The sleeve is made of such a length as to project a considerable distance from one side of the wheel. At this side of the wheel is placed a hollow conical member 5 which may be described as a buttress member, as it bears by its large end against one of the side plates 2 at a point substantially coinciding with the line of intersection of the two cones from the outer surface of the side plate. The two ends of the bearing sleeve 3 are preferably beaded over one end to engage with the outer face of one of the side plates 2, and the other end to engage with a small and outer end of the hollow cone 5.

The chamber formed between the conical buttress member 5, a side plate 2, and the hollow or tubular sleeve 3, may be utilized as a grease or oil receiving chamber for the wheel. If this be done, then the tubular axis or sleeve 3 should have one or more holes 30 in its side, so placed as to communicate with the axle 10 upon which the wheel is mounted. In the construction illustrated in Figure 4 this hole may be made at or about the center of length of the sleeve 3 and will then communicate with this chamber whichever way it may be assembled in the completed wheel.

Between the two arms or standards 1 forming a part of the frame, extends a pin or axle 10. This may be secured in place by bolts 11 which screw into sockets formed in the ends of the axle, or this axle may in some cases be made as illustrated, of a tube. It is also desirable to place a washer as 32 between the standard 1 and the hub section of the wheel.

It will be noted that the construction of the wheel illustrated has its bearing at one side considerably offset beyond the side limit of the wheel. It is therefore possible to assemble these wheels in the skate in the separated position shown in Figure 2, or in the closely adjacent position shown in Figure 3. The manner of assembling will depend upon the choice of the user and the kind of service to which it is to be applied.

I have found that the tread member 4, when made of a rubber compound, has rather a long life. It may be very conveniently renewed when worn out. It also has such advantages in the way of securing of grip upon the skating surface, absence of noises and resiliency, which would compensate even if its life was very much shorter than that of other types of wheels.

What I claim as my invention is:

1. A wheel having a tubular bearing member provided with terminal outwardly projecting beads, two disk-like side plates, a disk-like body between said plates and extending beyond the plates to form a tread surface, and a hollow cone surrounding one end of the central tube with its small end having a thrust bearing against the bead at that end of the tube and its large end having a thrust bearing against the outer face of one of the plates.

2. A roller skate wheel having two side plates, a central disk of larger diameter than the side plates, an axial member passing through both side plates and the central disk, a hollow cone having its large end bearing against the outer surface of one side plate and a tubular tie member passing axially through the other parts and having thrust bearing at one end for a side plate and at the other end for the small end of the cone.

3. A roller skate wheel having a tubular axis, a wheel body mounted upon said axis and a hollow conical buttress mounted upon the tubular axis to provide a thrust bearing between the said axis and one side of the wheel body and also to form a grease reservoir, the tubular axis having a feed hole therethrough.

4. A roller skate wheel comprising a tubular bearing member, two side plates dished to form inner and outer bands composed of segments of oppositely inclined cones, a resilient disk clamped between said side plates, a coned hollow buttress member engaging by its larger end with one side plate and with its smaller end fitting upon the tubular bearing member, said bearing member being beaded at its ends to support said buttress cone and the opposite side plate.

Signed at Seattle, King County, Washington, this 6th day of February, 1925.

ALFRED T. RAUTENBERG.